(12) United States Patent
Chambon-Cartier (10) Patent No.: US 11,314,828 B2
(45) Date of Patent: Apr. 26, 2022

(54) DYNAMIC AND PERSONALIZED PRODUCT PLACEMENT IN ELECTRONIC FILES

(71) Applicant: IQ2 HOLDINGS, INC., Montreal (CA)

(72) Inventor: Mathieu Chambon-Cartier, Montreal (CA)

(73) Assignee: IQ2 HOLDINGS, INC., Montreal (CA)

(*) Notice: Subject to any disclaimer, the term of this patent is extended or adjusted under 35 U.S.C. 154(b) by 16 days.

(21) Appl. No.: 16/885,432

(22) Filed: May 28, 2020

(65) Prior Publication Data

US 2021/0011960 A1    Jan. 14, 2021

Related U.S. Application Data

(60) Provisional application No. 62/873,647, filed on Jul. 12, 2019.

(51) Int. Cl.
| | |
|---|---|
| G06F 16/20 | (2019.01) |
| G06F 16/9535 | (2019.01) |
| G06F 16/9537 | (2019.01) |
| G06F 16/955 | (2019.01) |
| G06T 19/00 | (2011.01) |

(52) U.S. Cl.
CPC ...... *G06F 16/9535* (2019.01); *G06F 16/9537* (2019.01); *G06F 16/9554* (2019.01); *G06T 19/006* (2013.01)

(58) Field of Classification Search
CPC ............. G06F 16/9535; G06F 16/9537; G06F 16/9554; G06T 19/006
See application file for complete search history.

(56) References Cited

U.S. PATENT DOCUMENTS

| | | | | |
|---|---|---|---|---|
| 8,069,169 | B2* | 11/2011 | Fitzpatrick | G06Q 10/06311 707/732 |
| 8,996,538 | B1* | 3/2015 | Cremer | G06F 16/70 707/749 |
| 10,269,041 | B1* | 4/2019 | Jain | G06Q 30/0255 |
| 2012/0239506 | A1* | 9/2012 | Saunders | G06Q 30/02 705/14.67 |
| 2014/0247278 | A1* | 9/2014 | Samara | G06K 17/0016 345/633 |
| 2018/0276895 | A1* | 9/2018 | Hodge | G06T 11/00 |
| 2018/0374276 | A1* | 12/2018 | Powers | G06T 19/20 |
| 2019/0009133 | A1* | 1/2019 | Mettler May | A63B 24/0075 |

(Continued)

*Primary Examiner* — Tarek Chbouki
(74) *Attorney, Agent, or Firm* — Dentons US LLP (57) ABSTRACT

A system to provide dynamic placement of new images in an electronic file presented on an electronic device according to various attributes associated with a user operating the electronic device. A scanning mechanism is implemented to scan each image within the electronic file to identify tagged objects. A selection mechanism is implemented to select the new images of various products based on geographic and demographic attributes associated with the user. A placement mechanism is implemented to fittingly replace all the tagged objects with the new images. The electronic file is updated to include the selected products rather than the tagged objects. While the user is accessing the electronic file on the electronic device, the user is able to view the selected products rather than the tagged objects in the electronic file.

20 Claims, 6 Drawing Sheets

(56) References Cited

U.S. PATENT DOCUMENTS

2019/0095467 A1\* 3/2019 Kislyuk .............. G06F 16/5866
2020/0301575 A1\* 9/2020 Lindholm ........... G06F 3/04817
2021/0096705 A1\* 4/2021 Rosenberg ............ G06F 3/0486

\* cited by examiner

DYNAMIC AND PERSONALIZED PRODUCT PLACEMENT IN ELECTRONIC FILES

RELATED APPLICATION DATA

This application claims the benefit of priority U.S. Provisional Application No. 62/874,647, filed Jul. 12, 2019, and all the benefits accruing therefrom under 35 U.S.C. § 119, the contests of which are incorporated by reference in their entirety.

TECHNICAL FIELD

The subject matter described herein relates generally to dynamic placement of images in electronic files presented on an electronic device according to various attributes associated with a user operating the electronic device.

BACKGROUND

Content creators may generate video media (e.g., movie, television show, documentary, commercial) that includes multiple scenes, such as those presenting actors, scenery, and objects. Various platforms, such as broadcast television programs, cable television programs, satellite television programs, and internet-based programs may stream the video media. Users can view the video media from any one of the platforms on their electronic device, such as a mobile phone, television, or computer. Although the content is available on different platforms, the content is the same for each viewer, due to the challenges in generating new content. Conventional attempts may select particular product commercials appropriate for each user, but the video media remains the same. However, conventional video processing systems are unable to change objects within the generated content for each user without generating an entirely new scene.

SUMMARY

For the aforementioned reasons, what is therefore needed is a technique to seamlessly overlay images in an electronic file of a video media being presented on an electronic device of a user to appear as content based on preferences and geolocation of the user. The systems and methods described herein aim to dynamically edit the electronic file of the video media being presented on the electronic device of the user to include personalized product images without a need to generate a new scene. The personalized product images may be selected based on processing of data associated with a profile of the user. The data may include geolocation information of the user, consumer habits of the user, personal interests of the user, cultural habits of the user, way of life of the user, and attentiveness of the user while watching the video media on their electronic device.

In one embodiment, a method may include retrieving, by a server, an electronic file comprising a set of images, the electronic file configured to be displayed on an electronic device operated by a user; identifying, by the server, within the set of images, an object image comprising a first object having a visual indicator tag; selecting, by the server, a media element based on a category of the first object and user profile having a set of user attributes; and while displaying, on the electronic device, the set of images of the electronic file, overlaying, by the server, the media element on the visual indicator tag within the object image.

In another embodiment, a system may include a server configured to retrieve an electronic file comprising a set of images, the electronic file configured to be displayed on an electronic device operated by a user; identify within the set of images, an object image comprising a first object having a visual indicator tag; select a media element based on a category of the first object and user profile having a set of user attributes; and while displaying, on the electronic device, the set of images of the electronic file, overlay the media element on the visual indicator tag within the object image.

In an embodiment, there is provided a method comprising: (a) retrieving, by a server, an electronic file comprising a set of images, the electronic file configured to be displayed on an electronic device operated by a user; (b) identifying, by the server, within the set of images, an object image comprising a first object having a visual indicator tag; (c) selecting, by the server, a media element based on a category of the first object and user profile having a set of user attributes; and (d) while displaying, on the electronic device, the set of images of the electronic file, overlaying, by the server, the media element on the visual indicator tag within the object image.

In an embodiment, the method further comprises identifying, by the server, a visual boundary of the visual indicator tag associated with the first object, wherein the server overlays, while displaying the set of images within the electronic file, the media element on the visual boundary.

In an embodiment, the visual indicator tag identifies the visual boundary.

In an embodiment, the method further comprises selecting, by the server, the media element based on a unique identifier associated with the electronic device.

In an embodiment, the unique identifier is an IP address of the electronic device.

In an embodiment, the IP address of the electronic device is associated with location data of the electronic device.

In an embodiment, the visual indicator tag is a machine-readable code.

In an embodiment, the set of user attributes comprise at least one of an age, a sex category, an income level, an education level, or demographic data associated with the user.

In an embodiment, the method further comprises selecting, by the server, the media element based on a request by the user.

In an embodiment, the electronic file is an augmented reality video displayed on the electronic device.

In an embodiment, there is provided a system comprising a server, the server configured to: (a) retrieve an electronic file comprising a set of images, the electronic file configured to be displayed on an electronic device operated by a user; (b) identify within the set of images, an object image comprising a first object having a visual indicator tag; (c) select a media element based on a category of the first object and user profile having a set of user attributes; and (d) while displaying, on the electronic device, the set of images of the electronic file, overlay the media element on the visual indicator tag within the object image.

In an embodiment, the server is configured to identify a visual boundary of the visual indicator tag associated with the first object, wherein the server overlays, while displaying the set of images within the electronic file, the media element on the visual boundary.

In an embodiment, the visual indicator tag identifies the visual boundary.

In an embodiment, the server is configured to select the media element based on a unique identifier associated with the electronic device.

In an embodiment, the unique identifier is an IP address of the electronic device.

In an embodiment, the IP address of the electronic device is associated with location data of the electronic device.

In an embodiment, the visual indicator tag is a machine-readable code.

In an embodiment, the set of user attributes comprise at least one of an age, a sex category, an income level, an education level, or demographic data associated with the user.

In an embodiment, the server is configured to select the media element based on a request by the user.

In an embodiment, the electronic file is an augmented reality video displayed on the electronic device.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

A system may provide personalized online products within a video media (for example, a movie) to a user accessing the video media on their electronic device. The system may execute a scanning mechanism to scan each image within the video media presented on the electronic device. Using the scanning mechanism, the system may identify marked and tagged objects (for example, a car) within the images of the video media. The system may execute a selection mechanism to select personalized products (for example, red SUVs) based on geographic and demographic attributes (for example, user has been researching about the red color cars and the user is in Texas) associated with the user, as well as information associated with the marked and tagged objects (for example, a type of car). The system may execute a placement mechanism to replace the marked and tagged objects in real time with the personalized products within the images of the video media presented on the electronic device. This allows the user to view the personalized products rather than the marked and tagged objects in the video media while watching the video media on their electronic device.

A method for creating new and personalized product placements for users of various electronic devices, such as smart TVs, augmented reality (AR)/virtual reality (VR) devices, and smartphones is disclosed. The method may include steps to change multiple tagged objects with multiple personalized products during a media presentation being presented on an electronic device of a user without reshooting the media presentation. The method may include steps to generate the multiple personalized products in the same media presentation presented on the electronic device of each user without increasing bandwidth and storage size of the media presentation. In some non-limiting instances, such targeted and personalized products placement in the media presentation presented on the electronic device for each user may assist advertisers to efficiently use advertising revenue sources by targeting their products only to particular users. The method may further allow a central server to revise the media presentation to include the multiple personalized products such that a revised media presentation is viewable on any electronic device without requiring any special media software.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

Figure 1:
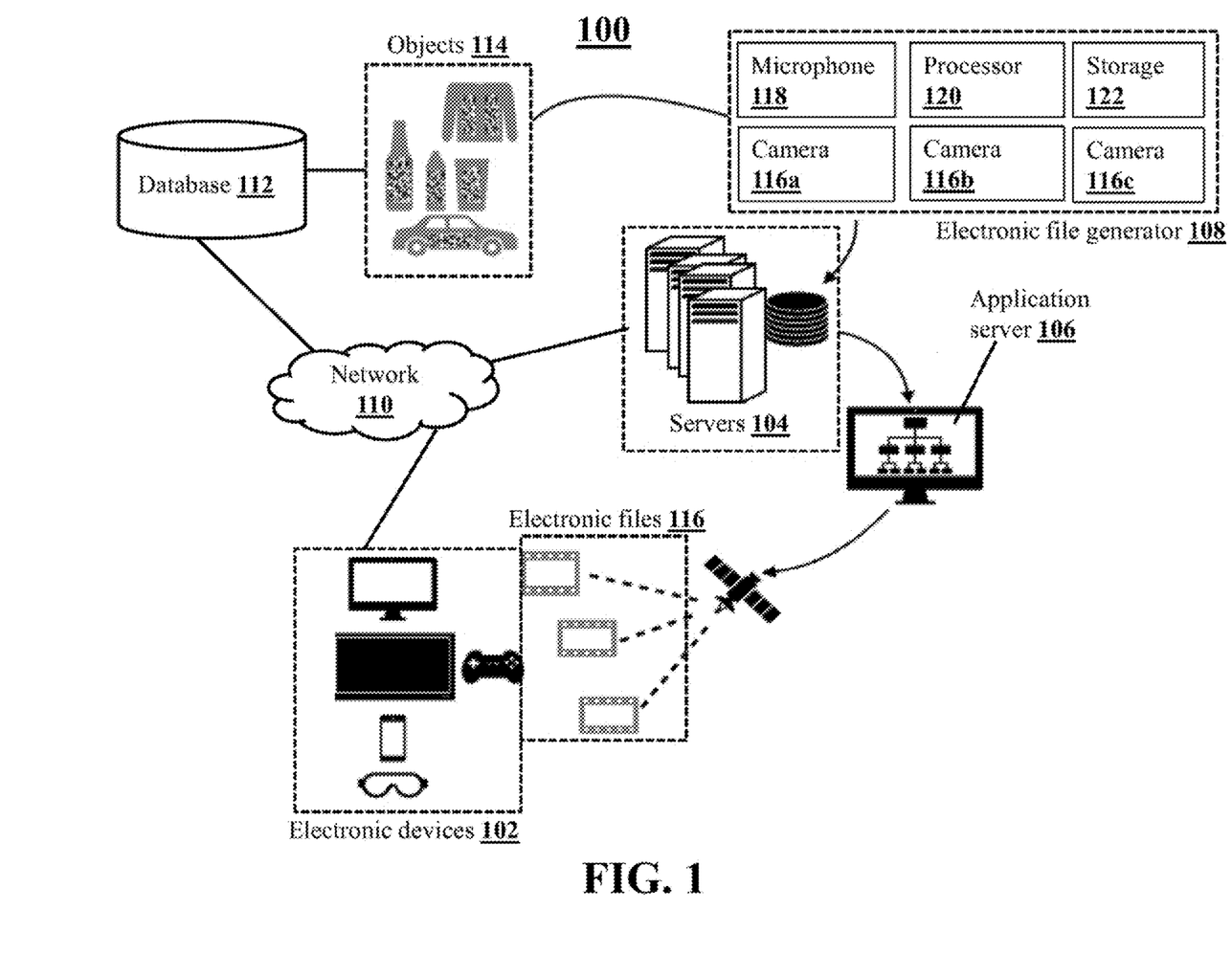
FIG. 1 shows various components of a system for dynamic placement of media elements on objects within electronic files viewed on an electronic device, according to an embodiment.

FIG. 1 shows various components of a system 100. The system 100 may include electronic devices 102, servers 104, application servers 106, electronic file generators 108, and databases 112 having images of objects 114.

The system 100 is described in a context of computer-executable instructions, such as program modules, being executed by server computers, such as a server 104 and/or an application server 106. The server 104 and/or application server 106 may operate an image personalization software. The electronic devices 102 may install and execute the image personalization software. For instance, a mobile device or a smart TV may include a media file application. The media file application may include programs, objects, components, data structures, etc., which may perform particular product personalization tasks. The features of the system 100 may be practiced either in a computing device, or in a distributed computing environment, where the product personalization tasks are performed by processing devices, which are linked through a network 110. In a distributed computing environment, the various program modules may be located in both local and remote computer storage media including memory storage devices.

The electronic devices 102, the servers 104, the application servers 106, the electronic file generators 108, and the databases 112 communicate with each other over the network 110. The electronic file generator 108 may refer to one or more electronic devices configured to generate electronic files capturing audio and/or video associated with an event. The electronic file generator 108 may include a microphone 118, processor 120, storage 122, and/or cameras 116a-116c. In some configurations, multiple cameras may generate multiple electronic files associated with the same event. For instance, multiple cameras may record the same event from different angles. The electronic file generator 108 may directly communicate with the servers 104 or communicate with the servers 104 utilizing the network 110 (not shown in FIG. 1) to transmit the generated electronic files.

The network 110 may include, but is not limited to, a private local area network, a public local area network, a wireless local area network, a metropolitan area network, a wide-area network, and Internet. The network 110 may further include both wired and wireless communications, according to one or more standards, via one or more transport mediums. The communication over the network 110 is in accordance with various communication protocols, such as a transmission control protocol and an internet protocol, a user datagram protocol, and an institute of electrical and electronics engineers communication protocols. The network 110 may further include wireless communications, according to Bluetooth specification sets, or another standard or proprietary wireless communication protocol. The network 110 may further include communications over a cellular network, including, for example, a global system for mobile communications, code division multiple access, and enhanced data for global evolution network.

The system 100 may operate in a local computing environment where the server 104 and/or the application server 106 may execute various product personalization and product placement tasks. The product personalization and the product placement tasks are associated with the dynamic placement of customized media elements on the tagged objects 114 within the electronic files 116 presented on the electronic device 102 of a user. The database 112 and application programs associated with the server 104 and/or the application server 106 may be stored and executed on local computing resources. The server 104 and/or the application server 106 may locally query the database 112 to retrieve the media elements for placing the media elements on the tagged objects 114 within the electronic files 116 presented on the electronic devices 102 of the user. The database 112 may store a file storing a relationship between different media elements, different geographical locations, and the tagged objects 114. In operation, the server 104 and/or the application server 106 may initially identify the objects 114 within the electronic files 116, then identify a corresponding media element from the database 112 using current location information associated with the user, and then superimpose the corresponding media element on the tagged objects 114 to update the content in the electronic files 116. While accessing the electronic files 116, the user is able to access updated content in the electronic files 116 on an interactive graphical user interface of their electronic device 102.

The system 100 may operate in a cloud-computing environment where the electronic devices 102 operated by the user may be cloud-optimized. The electronic devices 102 may execute an image personalization software, and the user may access the electronic files 116 via the image personalization software. A remote cloud-based server 104 and/or a remote cloud-based application server 106 may store and execute data and application programs associated with the image personalization software and the electronic devices 102. In the cloud-computing environment, a web browser on the electronic devices 102 may interface with an application program corresponding to the image personalization software. Utilizing the web browser executing on the electronic devices 102, the user may access the electronic files 116. The remote cloud-based server 104 and/or the remote cloud-based application server 106 may scan images within the electronic file 116 to identify the tagged objects 114. The remote cloud-based server 104 and/or the remote cloud-based application server 106 may select corresponding media elements from the database 112 using the information, such as current location information associated with the user and the tagged objects 114. The remote cloud-based server 104 and/or the remote cloud-based application server 106 may superimpose the media elements on the objects 114 in real time to update the content in the electronic files 116. While accessing the electronic files 116, the user is able to access updated content in the electronic files 116 on the interactive graphical user interface of their electronic devices 102.

An electronic file generator 108 is a portable or a non-portable electronic device. The electronic file generator 108 may perform operations according to programming instructions. The electronic file generator 108 may execute algorithms or computer executable program instructions. A single processor or multiple processors in a distributed configuration of the electronic file generator 108 may execute the algorithms or the computer executable program instructions. The electronic file generator 108 may interact with one or more software modules of a same or a different type operating within the system 100.

The electronic file generator 108 may include a processor or a microprocessor for performing computations for carrying the functions of the electronic file generator 108. Non-limiting examples of the processor may include, but not limited to, a microprocessor, an application specific integrated circuit, and a field programmable object array, among others. The processor may include a graphics processing unit specialized for rendering and generating computer-generated graphics. Non-limiting examples of the electronic file generator 108 may include, but are not limited to, a camera device, a video camera device, or a mobile device.

The electronic file generator 108 may include an operating system for managing various resources of the electronic file generator 108. An application-programming interface associated with the operating system may allow various application programs to access various services offered by the operating system. For example, the application-programming interface may set up wired or wireless connections to the electronic device 102, the server 104, and the application server 106. As a result, the electronic file generator 108 is capable of communicating with the electronic device 102, the server 104, and the application server 106 through the network 110 using wired or wireless communication capabilities.

The electronic file generator 108 may include the processor, which may execute one or more three-dimensional (3D) filming techniques and/or four-dimensional (4D) filming techniques to generate electronic files 116, such as video files. The filming techniques may include various software's, such as a development software, a pre-production software, a production software, and a post-production software. Using the 3D filming techniques and/or the 4D filming techniques, one or more cameras of the electronic file generator 108 may generate the electronic files 116. The cameras may receive an input from an environment that is within a field of view of the electronic file generator 108.

The input may include, for example, light images, such as video images and still images. The electronic file generator 108 may obtain and process the input in real-time.

The electronic file generator 108 may execute the 3D filming techniques and/or the 4D filming techniques to analyze the received input, and generate 3D data or 4D data of the environment. The 3D data or the 4D data of the environment may include information associated with data points in the 3D or the 4D space of the field of view, for example, in a Cartesian coordinate system or a polar coordinate system. The 3D data or the 4D data may include color and other information associated with the positions of the data points in the field of view. The electronic file generator 108 may process the 3D data or the 4D data, and generate the electronic file 116, which is an output file. The electronic file may include objects 114, humans, texts, symbols, etc. The electronic file generator 108 may further include an optical projection module that can project the electronic files 116 generated by the processor onto a display associated with the electronic file generator 108 or into the environment to establish an augmented reality.

The electronic file generator 108 may execute the 3D filming techniques and/or the 4D filming techniques to mark or tag some of the objects 114 during the creation of the electronic files 116. In some embodiments, the electronic file generator 108 may execute one or more of the 3D filming techniques and/or the 4D filming techniques to mark or tag some of the objects 114 after the creation of the electronic files 116, and then re-create the electronic files 116. The electronic file generator 108 may mark or tag some of the objects 114 in the electronic files 116 using visual indicator tags, such as machine-readable codes. The machine-readable codes may be placed on a body of some of the objects 114 in the electronic files 116. The machine-readable codes may be visible on the body of some of the objects 114 in the electronic files 116. In some cases, the machine-readable codes may not be clearly visible on the body of some of the objects 114 in the electronic files 116. The machine-readable codes may be bar codes and quick response codes. The electronic file generator 108 may store the electronic files 116, which may include various marked and tagged objects 114 in the database 112. Some of the objects 114 within the electronic files 116 may be untagged as well.

The electronic file generator 108 may receive a request from an electronic device 102 to access the electronic files 116. In some embodiments, the electronic file generator 108 may receive a request from the image personalization software executing on the electronic device 102 to access the electronic files 116. The electronic file generator 108 may electronically transmit the electronic files 116 to the electronic device 102 directly via the application server 106. In some embodiments, the electronic file generator 108 may electronically transmit the electronic files 116 to the electronic device 102 via the server 104.

An electronic device 102 is a portable or a non-portable computing device that performs operations according to programming instructions. The electronic device 102 may execute algorithms or computer executable program instructions. A single processor or multiple processors in a distributed configuration of the electronic device 102 may execute the algorithms or the computer executable program instructions. The electronic device 102 may interact with one or more software modules of a same or a different type operating within the system 100.

The electronic device 102 may include a processor or a microprocessor for performing computations for carrying the functions of the electronic device 102. Non-limiting examples of the processor may include, but not limited to, a microprocessor, an application specific integrated circuit, and a field programmable object array, among others. The processor may include a graphics processing unit specialized for rendering and generating computer-generated graphics. Non-limiting examples of the electronic device 102 may include, but are not limited to, a cellular phone, a tablet computer, a head-mounted display, smart glasses, wearable computer glasses, a personal data assistant, a virtual reality device, an augmented reality device, or a personal computer. In augmented reality, the electronic device 102 may project or superimpose a computer-generated image of a media element onto an object 114 having a visual indicator tag.

The electronic device 102 may include an operating system for managing various resources of the electronic device 102. An application-programming interface associated with the operating system may allow various application programs to access various services offered by the operating system. For example, the application-programming interface may set up wired or wireless connections to the electronic file generator 108, the server 104, and the application server 106. As a result, the electronic device 102 is capable of communicating with the electronic file generator 108, the server 104, and the application server 106 through the network 110 using wired or wireless communication capabilities.

The electronic device 102 may include an imaging equipment, such as a camera. The imaging equipment may generate some of the electronic files 116 containing a stream of images, which may be stored in a local memory. In some embodiments, the electronic file generator 108 may transmit the electronic files 116 to the electronic device 102. The electronic files 116 may be accessible via the image personalization software. A display screen of the electronic device 102 may display the electronic files 116. The display screen may be a light emitting display for presentation of the images of the electronic files 116 in an interactive and a visual form. The display screen may include a head-mounted display system for optically presenting information of the electronic files 116 into the eyes of the user through a virtual retinal display.

The electronic device 102 may include input and output devices, such as sensors, touch screen, keypad, microphone, mouse, touch screen display, and a graphical user interface. The input and output devices may allow the user interaction with various programs and computer software applications, such as the image personalization software configured to communicate with the server 104 and/or the application server 106 in order to customize various tagged objects 114 within the electronic files 116 presented on the display screen of the electronic device 102.

The electronic device 102 may include the image personalization software. The user may interact with the application server 106 via the image personalization software to receive the electronic files 116 from the electronic file generator 108. The server 104 may personalize the tagged objects 114 in the electronic files 116 based on preferences, attributes, current location, and habits of the user.

The processor of the electronic device 102 may implement the image personalization software. The implementation of the image personalization software may be as a computer program product, stored in non-transitory storage medium, when executed on the processor. The image personalization software may be a software stack running on the operating system of the electronic device 102. The image personalization software may have a protocol layer and a user interface layer where each layer may be responsible for specific tasks and functions. The protocol layer may communicate with the operating system, and manages various connections of the electronic device 102 over the network 110. The protocol layer may communicate with the user interface layer. The protocol layer may control the user interface layer to present the customized objects 114 within the electronic files 116 to the user via a user interface of the image personalization software, and to receive information from the user via the user interface.

The electronic device 102 may include a web browser. The web browser may access and present an image personalization web application. The processor of the electronic device 102 may execute the image personalization web application, and then allow the user to view customized objects 114 within the electronic files 116 using the image personalization web application. The electronic device 102 may execute the image personalization web application outside of the web browser, for example, an operating system-specific image personalization software that accesses and presents information processed by the processor to customize the tagged objects 114 based on the preferences, the attributes, the current location, and the habits of the user.

The image personalization software may include various image-processing algorithms. The image-processing algorithms may include a video scanning software, a video editing software, an audio editing software, and a visual effects software. Some of the image-processing algorithms may include a post-production software, such as After Effects software, Fusion software, Nuke software, Cry Engine software, Flame software, and Flaire software. The image personalization software is in communication with the server 104 that is executing the image processing algorithms. In some embodiments, the image personalization software may be in communication with the application server 106 that is executing the image processing algorithms. In some embodiments, the image personalization software is in communication with both the server 104 and the application server 106 that are executing some of the image processing algorithms. The image-processing algorithms may continuously scan and process various images in the electronic files 116 received from the electronic file generator 108 and presented on the electronic device 102. The image-processing algorithms may scan and process the images to identify the various objects 114, which are tagged and marked within the images of the electronic files 116.

As the electronic files are 116 being accessed by the user on the display screen of the electronic device 102, in a background process, the image personalization software via the image-processing algorithms may replace the tagged and the marked objects 114 in the electronic files 116 with new items or place media elements on the tagged objects 114 based on the preferences, the attributes, the current location, and the habits of the user of the electronic device 102. Accordingly, the user may access the electronic files 116 containing the new items or the media items placed on the objects 114 on their electronic device 102.

A server 104 may be a computing device comprising a processing unit. The processing unit may include a processor with computer-readable medium, such as a random access memory coupled to the processor. The server 104 may be running algorithms or computer executable program instructions. A single processor or multiple processors in a distributed configuration of the server 104 may execute the algorithms or the computer executable program instructions. The server 104 may interact with one or more software modules of a same or a different type operating within the system 100.

Non-limiting examples of the processor may include a microprocessor, an application specific integrated circuit, and a field programmable object array, among others. Non-limiting examples of the server 104 may include a server computer, a workstation computer, a tablet device, and a mobile device (e.g., smartphone). For ease of explanation, the FIG. 1 shows multiple computing devices functioning as the server 104. However, some embodiments may include a single computing device capable of performing the product personalization and the product placement tasks described herein.

The server 104 is associated with the electronic device 102, the electronic file generator 108, the application server 106, and the database 112 via the network 110. The server 104 may receive a notification from the electronic device 102 when the user of the electronic device 102 access the electronic files 116 on the electronic device 102. In some embodiments, the server 104 may receive the notification from the image personalization software executed on the electronic device 102 when the user of the electronic device 102 access the electronic files 116 on the electronic device 102. In some embodiments, the server 104 may receive the notification from the application server 106 running the image personalization software executed on the electronic device 102 when the user of the electronic device 102 access the electronic files 116 on the electronic device 102.

The server 104 may access the electronic files 116 presented on the electronic device 102 in the background process on receiving the notification. Upon accessing the electronic files 116, the server 104 may execute the image-processing algorithms on the various images in the electronic files 116. The execution of the image-processing algorithms on the various images in the electronic files 116 may result in extraction of features associated with the objects 114 from each image. The features may include a visual indicator tag. The visual indicator tag may be the machine-readable code. The machine-readable code may be the bar code or the quick response code. The server 104 may match the extracted features with one or more features stored in the database 112. When the extracted features associated with the objects 114 matches with the features stored in the database 112, the server 104 may then confirm that the objects 114 are tagged correctly. The server 104 may then identify each object 114. The server 104 may determine information associated with each object 114 from the database 112 using the machine-readable code. The information associated with each object 114 may include a type of the object 114, such as a beverage bottle or a vehicle. The information associated with each object 114 may further include a shape and a size of the object 114.

The server 104 may execute one or more image-feature algorithms on an image of each tagged object 114 to determine a visual boundary of the visual indicator tag on each tagged object 114. The server 104 may use the visual boundary of the visual indicator tag to determine a size of the visual indicator tag on each tagged object 114. The server 104 may further execute the image-feature algorithms on the image of each tagged object 114 to determine a position and an orientation of each tagged object 114 in the electronic files 116 presented on the electronic device 102. The server 104 may execute the image-feature algorithms in different modes. In one mode, the image-feature algorithms may be configured for approximate determination of the position, the size, and the orientation of each identified object 114. In another mode, the image-feature algorithms may be configured for accurate determination of the position, the size, and the orientation of each identified object 114. The server 104 may store the determined information associated with the position, the size, and the orientation of each tagged object 114 in the database 112.

The server 104 may execute a geolocation algorithm to determine a current location of the electronic device 102 where the user is accessing one or more electronic files 116. The geolocation algorithm may use a unique identifier, such as an IP address of the electronic device 102 to determine the current location of the electronic device 102. For this purpose, the server 104 may first determine the IP address of the electronic device 102. In one embodiment, the server 104 may determine the IP address of the electronic device 102 from the application server 106. The application server 106 may determine the IP address of the electronic device 102 based on a web activity done from the electronic device 102. The web activity may include accessing the image personalization software. In another embodiment, the server 104 may determine the IP address of the electronic device 102 from the database 112. The database 112 may store the IP address of the electronic device 102. The IP address may have two parts, such as a particular network identifier and a specific device identifier. The IP address may be a 32-bit number that identifies the electronic device 102.

The server 104 may use the IP address of the electronic device 102 to search the database 112. The database 112 may include a table that is helpful for geolocation services. The table may include pairing information between the IP addresses and corresponding geographical locations. The table may include information obtained from various regional internet registries. The table may also include the information provided by various internet service providers. Using the information in the database 112, the server 104 is able to use the IP address of the electronic device 102 to determine the approximate current location of the electronic device 102. The approximate current location may include information associated with a current city of the electronic device 102.

The server 104 may determine information associated with a user profile of the user from the database 112. The user profile may include the information associated with a name of the user, an age of the user, a gender of the user, hobbies of the user, personal interests of the user, occupation of the user, habits of the user, qualification of the user, marriage history of the user, preferences of the user, social networking accounts of the user, and medical history of the user. The user profile may update automatically upon any change in the social media activity and the medical history of the user.

The server 104 may determine browsing history of the user on the electronic device 102 for a predetermined period of time. The server 104 may also determine browsing history of the user on one or more computing devices, which are wired or wirelessly linked to the electronic device 102 for the predetermined period of time. The server 104 may transmit instructions to the application server 106 to determine and transmit the browsing history of the user on the electronic device 102 and other computing devices for the predetermined period of time. The application server 106 may then determine a list of web sites being accessed by the user on the electronic device 102 and other computing devices over the predetermined period of time. The application server 106 may further determine a list of products being searched by the user on the web sites over the predetermined period of time. The application server 106 may further determine a list of articles being read by the user on the websites over the predetermined period of time. The application server 106 may process the information in list of the products, the list of the articles, and the list of the web sites to generate a research history report corresponding to the user, and store the research history report in the database 112. The application server 106 may transmit the research history report to the server 104. The server 104 may process and store the research history report in the database 112.

The server 104 may process the information associated with the research history report of the user, the user profile, and/or the current location of the user to select one or more media elements from the database 112 for placing on each tagged object 114 identified in the electronic files 116 accessed by the user on the electronic device 102. The database 112 may store a table having a pairing and a relationship between each tagged object 114, the media elements, and the location information. In another embodiment, the server 104 may process the information associated with the research history report of the user, the user profile, the current location of the user, and features associated with each object 114 to select the one or more media elements from the database 112 for placing on each tagged object 114 identified in the electronic files 116 accessed by the user on the electronic device 102. The features associated with each object 114 may include a type of the object 114, such as a beverage bottle or a vehicle. In yet another embodiment, the server 104 may process the information associated with the research history report of the user, the user profile, the current location of the user, and the features associated with each object 114 to select one or more items from the database 112 for replacing each tagged object 114 identified in the electronic files 116 accessed by the user on the electronic device 102.

The server 104 may select a size of each media element. The server 104 may select the size of each media element based on size of the visual indicator tag of each tagged object 114. The server 104 may select a color and a brightness of each media element. The server 104 may select the color and the brightness of each media element based on a background environment information of an image where the tagged object 114 is present. The background environment information of the image may include information associated with all colors in the image.

The server 104 may superimpose all media elements in their corresponding tagged objects 114 within the electronic files 116 accessed by the user on the electronic device 102. While the user is accessing the electronic files 116, at the same time, in the background process, the server 104 may superimpose all the media elements in their corresponding tagged objects 114 within the electronic files 116. Accordingly, when the user accesses the entire electronic files 116, the user may only view the media elements in the electronic files 116 rather than the tagged objects 114. The selection of the media elements placed in the electronic files 116 is in view of the information associated with the user. The information may include the current location information of the user using the electronic device 102.

The server 104 may replace all the tagged objects 114 with the corresponding items within the electronic files 116 accessed by the user on the electronic device 102. While the user is accessing the electronic files 116, at the same time, in the background process, the server 104 may replace all the tagged objects 114 with the corresponding items within the electronic files 116. Accordingly, when the user accesses the entire electronic files 116, the user may only view the items in the electronic files 116 rather than the tagged objects 114. The selection of the items placed in the electronic files 116 is in view of the information associated with the user. The information may include the current location information of the user using the electronic device 102.

An application server 106 may operate as a web server hosting a user-centric image personalization software accessible to the electronic device 102 via the network 110. The application server 106 may include a processing unit and a non-transitory machine-readable storage capable of executing various tasks and processes described herein. The processing unit may include a processor with computer-readable medium, such as a random access memory coupled to the processor. Non-limiting examples of the processor may include a microprocessor, an application specific integrated circuit, and a field programmable object array, among others. Non-limiting examples of the application server 106 may include workstation computers, laptop computers, server computers, laptop computers, and the like. While the system 100 includes a single application server 106, in some embodiments the application server 106 may include a number of computing devices operating in a distributed computing environment.

The application server 106 may be running algorithms or computer executable program instructions. A single processor or multiple processors in a distributed configuration of the application server 106 may execute the algorithms or the computer executable program instructions. The algorithms may include the image-processing algorithms and the image feature algorithms. The application server 106 may interact with one or more software modules of a same or a different type operating within the system 100. For instance, the application server 106 may execute the software applications configured to host a image personalization software website (e.g., Apache®, Microsoft IIS®), which may generate and serve various webpages to the electronic device 102. The user-centric image personalization software website may be used to access the electronic files 116 stored in the database 112. The electronic file generator 108 may generate the electronic files 116, and store the electronic files 116 in the database 112.

The application server 106 may require user authentication based upon a set of user authorization credentials (e.g., username, password, biometrics, cryptographic certificate). In such implementations, the application server 106 may access a local memory configured to store user credentials. The application server 106 may reference the local memory in order to determine whether a set of entered credentials purportedly authenticating the user match an appropriate set of credentials that identify and authenticate the user. Similarly, in some implementations, the application server 106 may generate and serve webpages to access the electronic files 116 to the electronic device 102 based upon information associated with the user and structure of a specialized graphical user interface of the electronic device 102.

The information associated with the user may be defined by data fields in user profile records stored in the database 112. The application server 106 may conduct an authentication of the user by executing an access directory protocol. Upon authentication, the application server 106 may generate the webpages associated with the user-centric image personalization software website on the interactive graphical user interface of the electronic device 102, access the electronic file 116 records stored in the database 112, according to the user specifics defined by the user profile record in the database 112.

A database 112 associated the server 104, the application server 106, the electronic file generator 108, and the electronic device 102 is capable of storing data in plain format and encrypted version. The data may include information associated with the user profile, the tagged objects 114, the media elements, the items, the electronic files 116, and the geolocation services table. The database 112 may be in communication with a processor of the server 104, the application server 106, the electronic file generator 108, and the electronic device 102. The processor is capable of executing multiple commands of the system 100. The database 112 may be part of the server 104, the application server 106, the electronic file generator 108, and the electronic device 102. The database 112 may be a separate component in communication with the server 104, the application server 106, the electronic file generator 108, and the electronic device 102. The database 112 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

Figure 2:
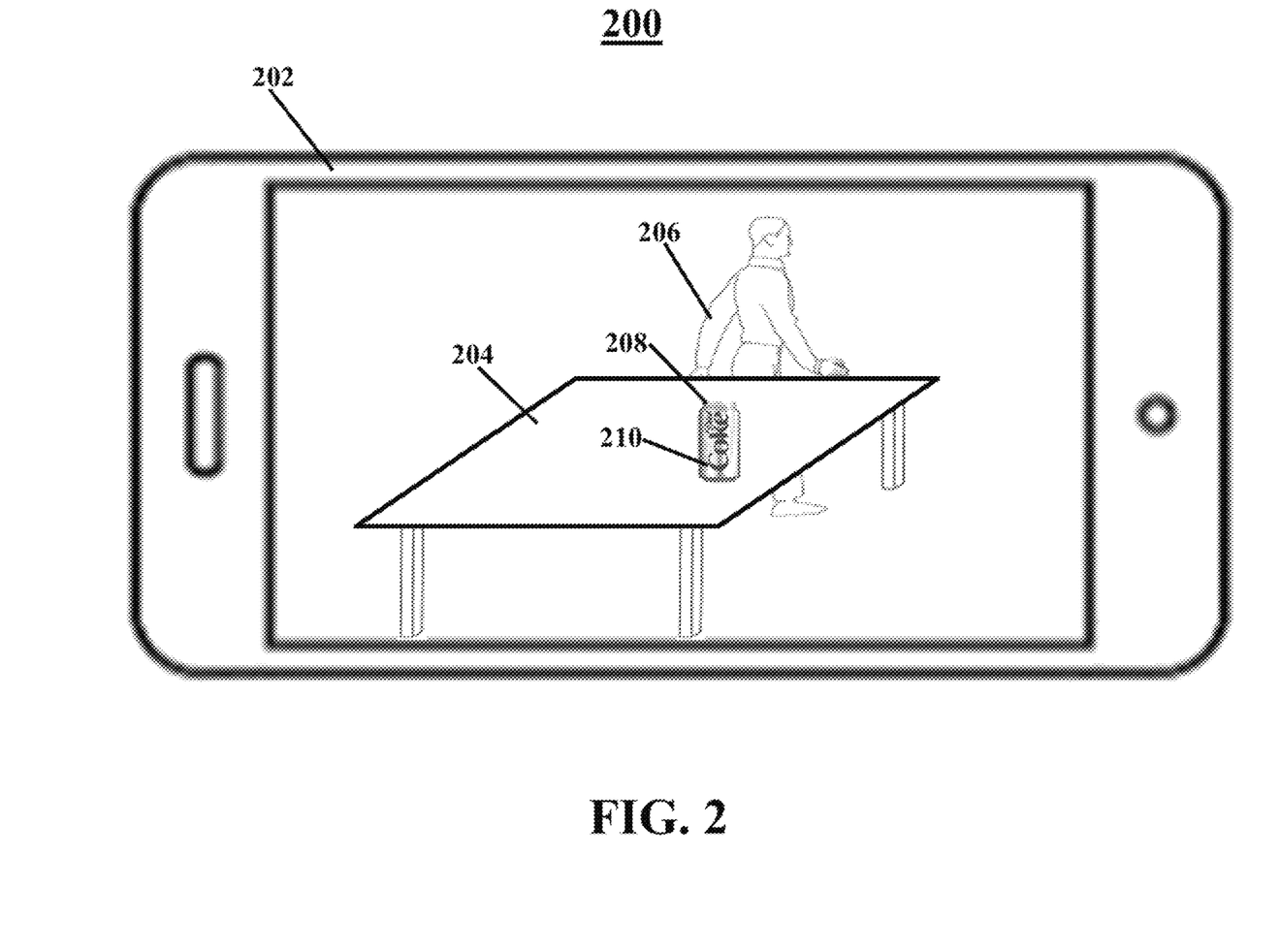
FIG. 2 shows a first media element placed on an object viewed on an electronic device according to attributes associated with a first user, according to an embodiment.

FIG. 2 shows an electronic device 200 viewed by a first user in USA. The electronic device 200 is a mobile device. Some alternate embodiments may include any type of the electronic device 200. For example, the electronic device 200 may be a computer or a display device in form of glasses, goggles, or any other structure that supports and incorporates various components of the electronic device 200, as well as serves as a conduit for electrical and other component connections.

The electronic device 200 may include processors, transmitters, receivers, communication components, antennas, user interfaces, sensors, and input devices. The processors of the electronic device 200 may perform one or more operations according to one or more programming instructions. The electronic device 200 may further include a software product, for example, an image personalization software executed by the processors of the electronic device 200. The electronic device 200 may be capable of communicating with a server and/or an application server using wired or wireless communication capabilities. The server and/or the application server may be associated with the image personalization software running on the electronic device 200.

The electronic device 200 may include a display screen 202. The display screen 202 may include one or more of display components, such as a cathode ray tube, a liquid crystal display, an organic light-emitting diode display, an active matrix organic light emitting diodes display, a super-active matrix organic light emitting diodes display, a plasma display, an incandescent light, a fluorescent light, a front or a rear projection display, or a light emitting diode indicator. The display screen 202 may be connected to a processor of the electronic device 200 for entering data and commands in the form of text, touch input, gestures, etc.

A first movie may be presented on the display screen 202, which may be watched by the first user. In some embodiments, the first movie may be presented via the image personalization software on the display screen 202. The first movie may include a scene having a table 204 and a person 206. In the scene, the person 206 may be walking past the table 204 where an object, such as a bottle 208 is shown. While the scene is presented on the display screen 202, in the background process, the server may scan every object being shown in the first movie to identify the objects having a visual indicator tag. In some embodiments, the server may scan every object in the first movie prior to the first movie presented on the display screen 202 to identify the objects having the visual indicator tag. The server may determine that the bottle 208 may have the visual indicator tag. The server may use attributes associated with the first user, such as current location information of the first user and/or information associated with the bottle 208 to select a first media element 210 from a database for overlaying on the bottle 208. The first media element 210 may be associated with users from the USA. The information associated with the bottle 208 may include a shape of the bottle etc. The server may then overlay the first media element 210 on the visual indicator tag of the bottle 208, which may result in the first user seeing the bottle 208 of diet cola in the scene on their display screen 202 as the first media element 210 is a label of the of diet cola. In some cases, the server may replace the bottle 208 with a bottle of diet cola in the scene displayed on their display screen 202.

Figure 3:
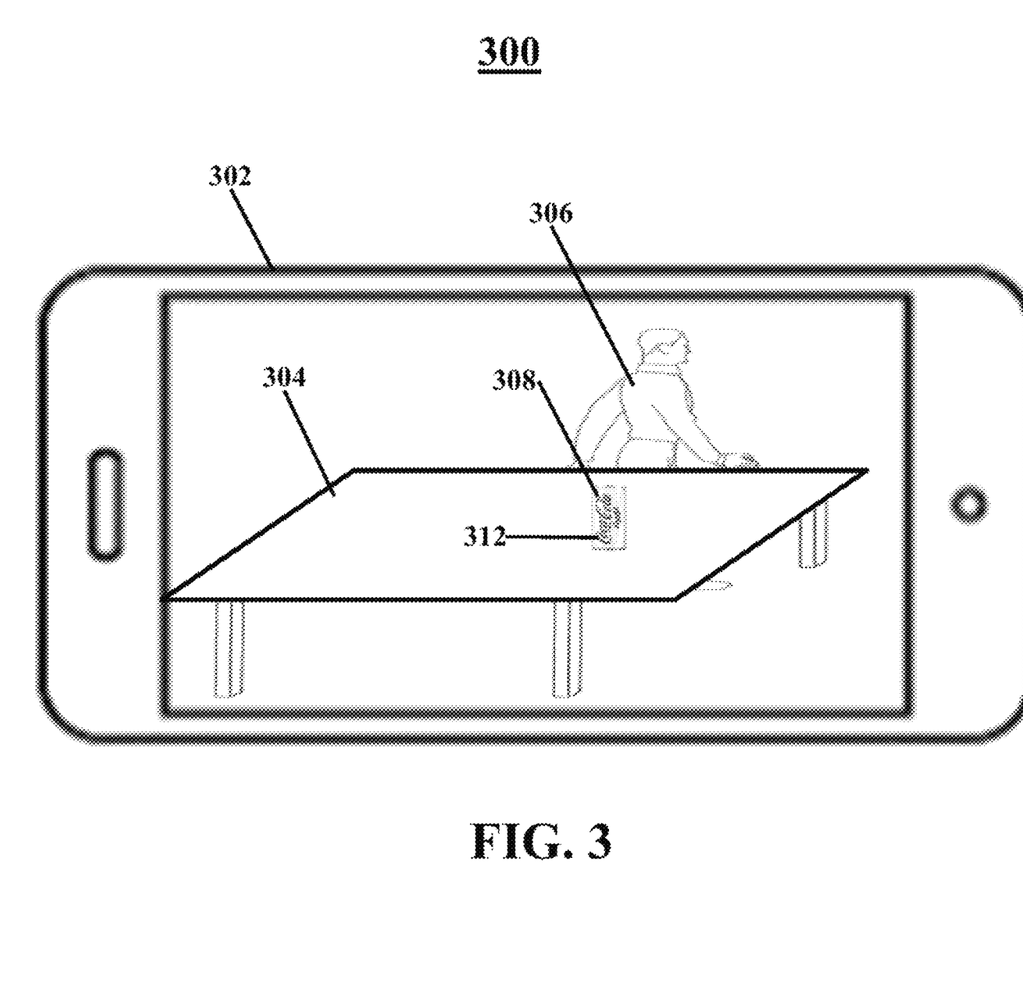
FIG. 3 shows a second media element placed on an object viewed on an electronic device according to attributes associated with a second user, according to an embodiment.

FIG. 3 shows the electronic device 300 viewed by a second user in France. A first movie may be presented on the display screen 302, which may be watched by the second user. In some embodiments, the first movie may be presented via the image personalization software on the display screen 302. The first movie may include a scene having a table 304 and a person 306. In the scene, the person 306 may be walking past the table 304 where an object, such as a bottle 308 is shown. While the scene is presented on the display screen 302, in the background process, the server may scan every object being shown in the first movie to identify the objects having a visual indicator tag. In some embodiments, the server may scan every object in the first movie prior to the first movie presented on the display screen 302 to identify the objects having the visual indicator tag. The server may determine that the bottle 308 may have the visual indicator tag. The server may use attributes associated with the second user, such as current location information of the second user and/or information associated with the bottle 308 to select a second media element 312 from a database for overlaying on the bottle 308. The second media element 312 may be associated with users from the France. The information associated with the bottle 308 may include a shape of the bottle etc. The server may then overlay the second media element 312 on the visual indicator tag of the bottle 308, which may result in the second user seeing the bottle 308 of light cola in the scene on their display screen 302 as the second media element 312 is a label of the of light cola. In some cases, the server may replace the bottle 308 with a bottle of light cola in the scene displayed on their display screen 302.

Figure 4:
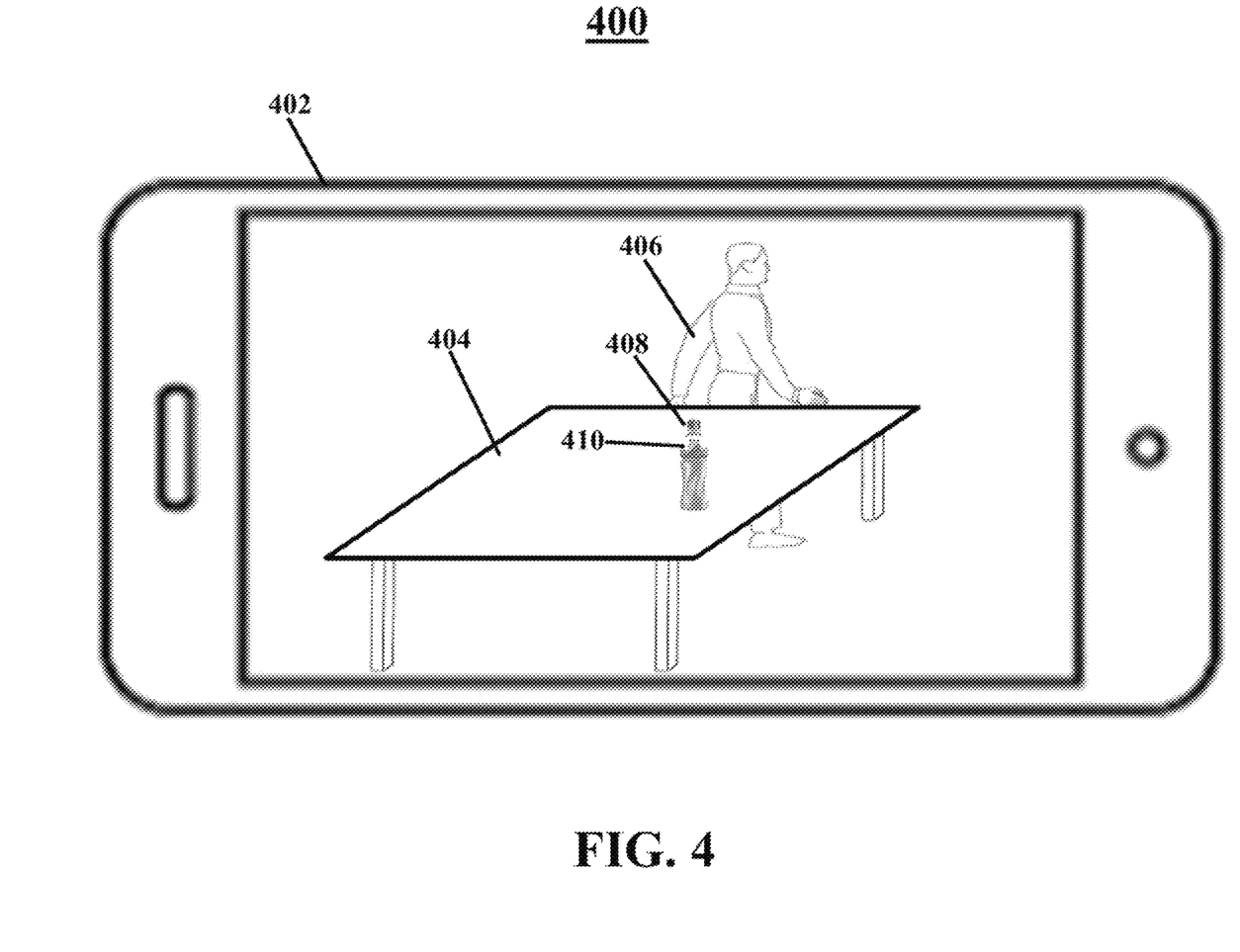
FIG. 4 shows a first media element placed on an object viewed on an electronic device according to attributes associated with a first user, according to an embodiment.

FIG. 4 shows the electronic device 400 viewed by a first user. A second movie may be presented on the display screen 402, which may be watched by the first user. In some embodiments, the second movie may be presented via the image personalization software on the display screen 402. The second movie may include a scene having a table 404 and a person 406. In the scene, the person 406 may be walking past the table 404 where an object, such as a bottle 408 is shown. While the scene is presented on the display screen 402, in the background process, the server may scan every object being shown in the second movie to identify the objects having a visual indicator tag. In some embodiments, the server may scan every object in the second movie prior to the second movie presented on the display screen 402 to identify the objects having the visual indicator tag. The server may determine that the bottle 408 may have a visual indicator tag. The server may use attributes associated with the first user, such as beverage research history of the first user on the electronic device 400 and/or information associated with the bottle 408 to select a first media element 410 from a database for overlaying on the bottle 408. The information associated with the bottle 408 may include a shape of the bottle etc. The server may then overlay the first media element 410 on the visual indicator tag of the bottle 408, which may result in the first user seeing the bottle 408 of juice in the scene on their display screen 402 as the first media element 410 is a label of the juice. In some cases, the server may replace the bottle 408 with a bottle of juice in the scene displayed on their display screen 402.

Figure 5:
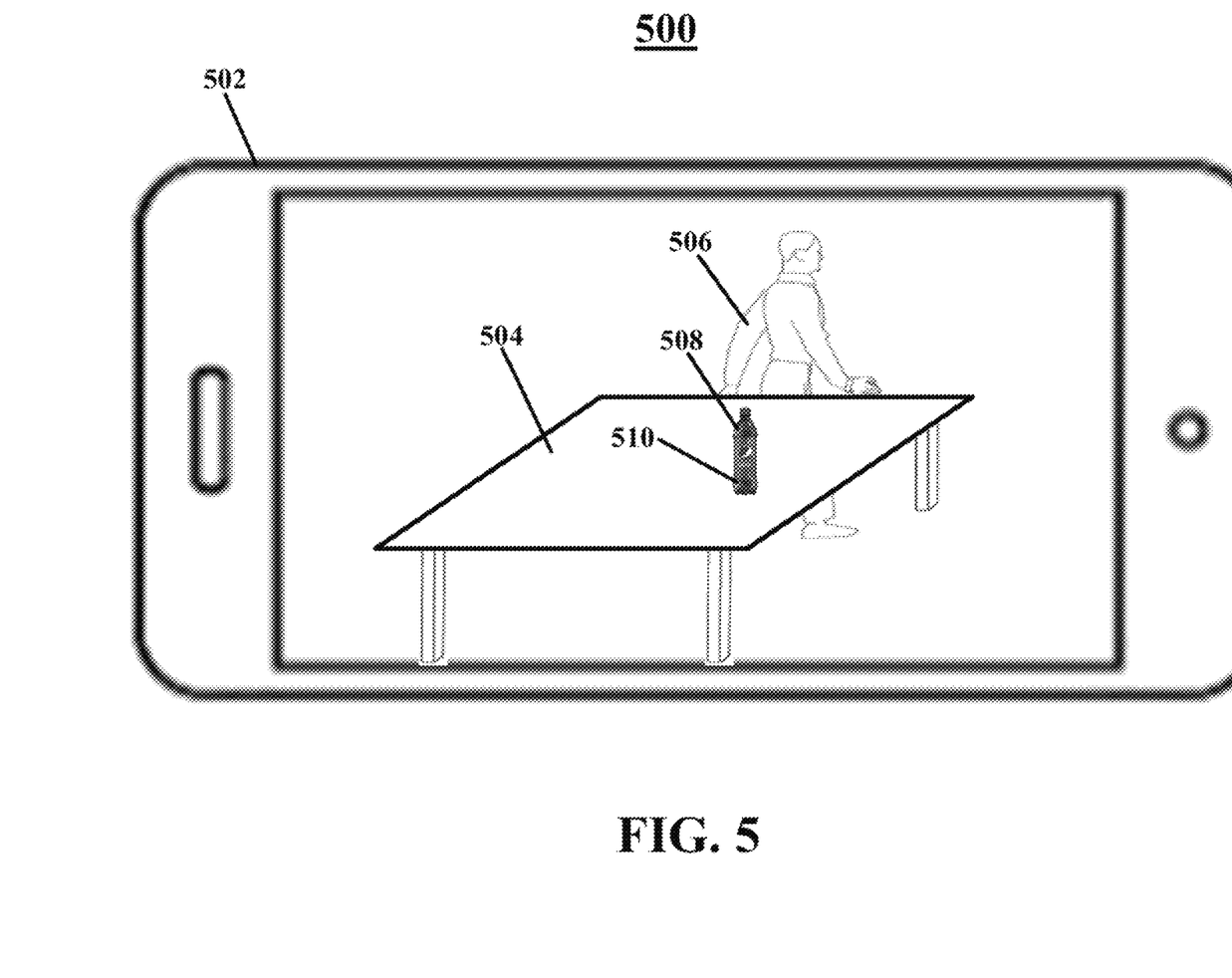
FIG. 5 shows a second media element placed on an object viewed on an electronic device according to attributes associated with a second user, according to an embodiment.

FIG. 5 shows the electronic device 500 viewed by a second user. A second movie may be presented on the display screen 502, which may be watched by the second user. In some embodiments, the second movie may be presented via the image personalization software on the display screen 502. The second movie may include a scene having a table 504 and a person 506. In the scene, the person 506 may be walking past the table 504 where an object, such as a bottle 508 is shown. While the scene is presented on the display screen 502, in the background process, the server may scan every object being shown in the second movie to identify the objects having a visual indicator tag. In some embodiments, the server may scan every object in the second movie prior to the second movie presented on the display screen 502 to identify the objects having the visual indicator tag. The server may determine that the bottle 508 may have a visual indicator tag. The server may use attributes associated with the second user, such as beverage research history of the second user on the electronic device 500 and/or information associated with the bottle 508 to select a second media element 512 from a database for overlaying on the bottle 508. The information associated with the bottle 508 may include a shape of the bottle etc. The server may then overlay the second media element 512 on the visual indicator tag of the bottle 508, which may result in the second user seeing the bottle 508 of cola in the scene on their display screen 502 as the second media element 512 is a label of the of cola. In some cases, the server may replace the bottle 508 with a bottle of cola in the scene displayed on their display screen 502.

Figure 6:
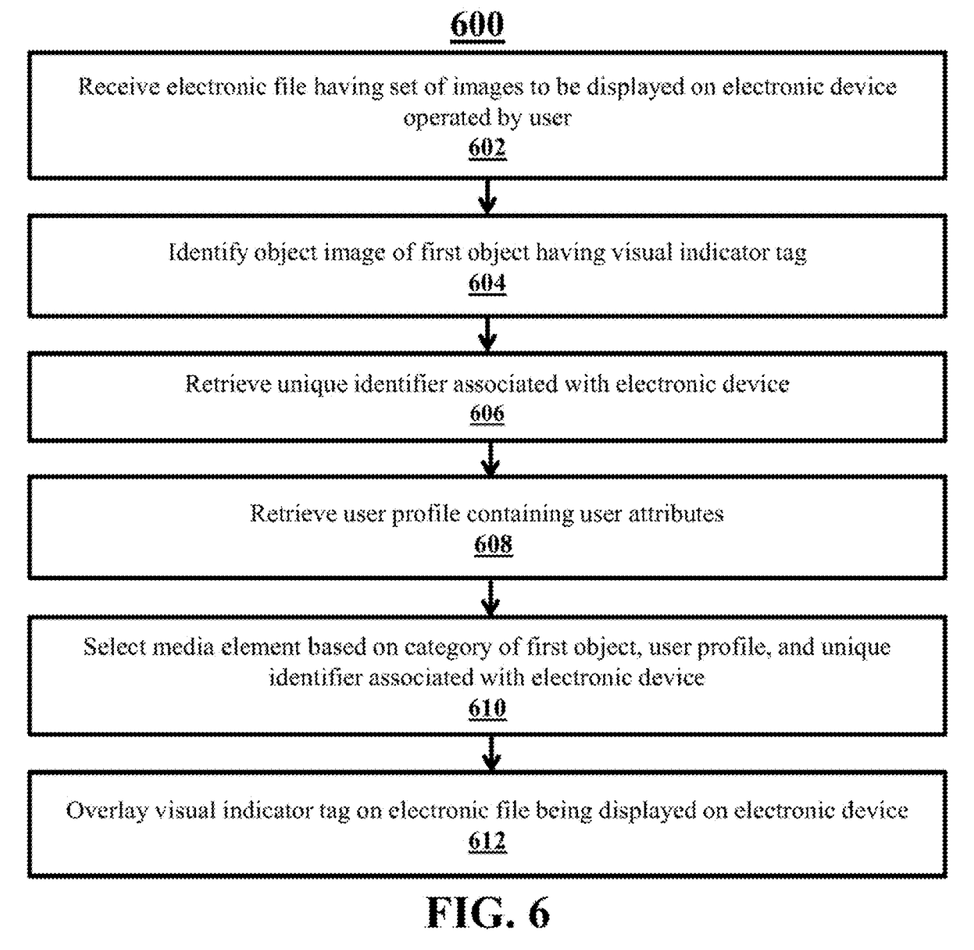
FIG. 6 shows a method for dynamic placement of media elements on objects within electronic files viewed on an electronic device, according to an embodiment.

FIG. 6 shows execution steps of a dynamic placement of media elements on objects within electronic files displayed on an electronic device, according to a method 600. The method 600 shown in the FIG. 6 may include execution steps 602, 604, 606, 608, 610, and 612. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 600 of the FIG. 6 is described as being executed by a server computer in this embodiment. The server computer executing one or more steps may be programmed to execute various other, unrelated essential features. The steps may also be executed by a plurality of server computers operating in a distributed computing and network environment.

In a first step 602, a server may retrieve an electronic file from a database. In another embodiment, the server may receive the electronic file from an application server. The application server may also present the electronic file on a user interface of an electronic device of a user. The electronic device maybe a mobile phone or a computer operated by the user.

The electronic file may include a video. In one embodiment, the server may store the video in a local memory associated with the server. In another embodiment, the server may present the video on the user interface of the electronic device of the user. The video may include a stream of images. Each image may include one or more objects. Some of the objects may include a visual indicator tag printed on their body (or otherwise associated with the object). The visual indicator tag may be a machine-readable code. The machine-readable code may be a quick response (QR) code, a barcode, or a customized code, such as any homegrown visual encoded identifier.

In a next step 604, the server may retrieve the video from the local memory, and scan each image in the video. In some embodiments, the server may scan each image in the video when the video is streamed on the electronic device. The server may identify object images within the video based on the scanning of the images in the video. The object images may include the objects having at least one visual indicator tag. The server may process each object image. For instance, the server may process the object image of a first object. The first object may be a bottle. The first object may include the visual indicator tag. The visual indicator tag may be the QR code. The server may process and store the information associated with the first object in the database.

In a next step 606, the server may receive a unique identifier associated with the electronic device from the electronic device. In one embodiment, the unique identifier may be a serial number of the electronic device, which is a unique numerical number assigned incrementally or sequentially to the electronic device to uniquely identify the electronic device. In another embodiment, the unique identifier may be an identification address of the electronic device. The identification address may be an Internet Protocol address (IP address) or MAC address of the electronic device, which is a numerical label assigned to the electronic device connected to a computer network that uses the Internet Protocol for communication.

The server may use the unique identifier, such as the IP address of the electronic device to determine location data of the electronic device. The location data may include geolocation coordinates associated with the different locations of the electronic device over a predetermined period of time. The geolocation coordinates may include geographical address information, such as city level address. The geolocation coordinates may include longitude and latitude information, which may indicate a position of the electronic device anywhere on the globe. The server may store the location data of the electronic device in the database.

In a next step 608, the server may retrieve a user profile associated with the user from the database. The user profile may include multiple user attributes. The user attributes may include an age, a gender category, an income level, an education level, and demographic data associated with the user. The server may further determine additional information associated with the user from the database. The additional information may include browsing history of the user, preferences of the user, recommendations of the user, and social media posting of the user on multiple social media websites and platforms. The server may periodically update the user profile using the information associated with the new social media postings of the user on the various social media websites.

In a next step 610, the server may process the information associated with the location data of the user. The server may process the information associated with a type and a category of the first object. The server may process the information contained in the user profile. The server may process the information associated with a type of the electronic device. The server may store results of the processing of the information associated with the location data, the type of the first object, the category of the first object, the type of the electronic device, and the user profile in the database.

The server may select a media element from the database based on the results of the processing. For example, the server may select the media element corresponding to a label of Coca Cola based on the location of the user and/or latest research of the user on the web. In another embodiment, the server may select the media element from the database based on a request of the user. For example, the user may prefer sugar free beverages. In such a case, the media element may correspond to a label for Diet sodas. In yet another embodiment, the server may select the media element from the database based on the results of the processing, the type of the electronic device, and the request of the user. The server may store the media element in the database.

In a next step 612, the server may overlay the media element on the visual indicator tag of the first object. For this purpose, the server may firstly identify a visual boundary of the visual indicator tag associated with the first object. The server may then adjust a size of the media element corresponding to the space within the visual boundary of the visual indicator tag associated with the first object. The server may place the media element within the visual boundary of the visual indicator tag in real-time such that the user may view the first object having the media element in the video streamed on the user interface of their electronic device.

In one embodiment, when the electronic device is a mobile device of the user, the user may view the first object having a first media element in the video streamed on the user interface of their mobile device. The first media element may correspond to a label for a first soda. In another embodiment, when the electronic device is a laptop computer of the user, the user may view the first object having a second media element in the same video streamed on the user interface of their laptop computer. The second media element may correspond to a label for a second soda. The server may select the first media element and the second media element for overlaying on the first object based on the preferences of the user, the type of the electronic device of the user, and current or past location of the electronic device. Accordingly, the user may view the video having different media elements on its different electronic devices.

Non-Limiting Examples

In one example, a user may use a mobile phone to watch a movie. The movie may include a movie sequence. An original movie sequence may depict a man walk past a table upon which a bottle of a product, such as cola is placed. Using a dynamic product placement mechanism, variations of the product within the movie sequence may be depicted depending on location of the user of the mobile device. When the user is in USA, a bottle of "diet cola" is placed on the table instead of the cola, whereas when the user is in France, a bottle of "light cola" is placed on the table instead of the cola.

In another example, a user may use a laptop computer to watch a television series. The television series may include a video sequence. An original video sequence may depict a man walk past a table upon which a bottle of a product, such as cola is placed. Using a dynamic product placement mechanism, variations of the product within the video sequence may be depicted depending on a web research history of the user on the mobile device. A bottle of diet cola may then be placed on the table instead of the cola based on analysis of the web research history of the user.

In yet another example, a user may use a smart TV within a house to watch a movie. The movie may include a movie sequence. An original movie sequence may depict a man walk past a table upon which a bottle of a product, such as cola is placed. Using a dynamic product placement mechanism, variations of the product within the video sequence may be depicted depending on a user activity on personal voice assistants, such as Cortana, Alexa, Siri, or Google Home located within the house. A bottle of light cola may then be placed on the table instead of the cola based on analysis of the user activity on the personal voice assistants.

In yet another example, a user may use a personal computer within a house to watch a film. The film may include a video sequence. An original video sequence may depict a car. Using a dynamic product placement mechanism, variations of the car within the video sequence may be depicted depending on a web research history of the user on the personal computer and/or a user activity on personal voice assistants, such as Cortana, Alexa, Siri, or Google Home located within the house. A sports car may then be placed in modified video sequence based on analysis of the web research history of the user and the user activity on the personal voice assistants. While watching the film, the user may repeatedly pause the film to view the sports car being shown in a scene in the film. At the end of the film, a message may be displayed on a user interface of the personal computer inviting the user to access detailed information about the sports car. The message may include interactive web links. The user may use the personal voice assistants to access the interactive web links, and then read the detailed information about the sports car.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
retrieving, by a server, an electronic file comprising a set of images, the electronic file configured to be displayed on an electronic device operated by a user;
identifying, by the server, within the set of images, an object image comprising a first object having a visual indicator tag;
identifying, by the server, the visual indicator tag;
retrieving, by the server, information about the first object based on the visual indicator tag, the information comprising a category of the first object;
retrieving, by the server, user profile data from a user profile having a set of user attributes;
selecting, by the server, a media element based on the category of the first object and the user profile data; and
while displaying, on the electronic device, the set of images of the electronic file, overlaying, by the server, the media element on the object image, wherein,
the user profile is stored as another electronic file,
the server comprises a processing unit, memory, and processing unit executable instructions stored in the memory, and
execution of the processing unit executable instructions causes the server to perform the method.

2. The method of claim 1, further comprising identifying, by the server, a visual boundary of the object image associated with the first object, wherein the server overlays, while displaying the set of images within the electronic file, the media element within the visual boundary.

3. The method of claim 2, wherein the visual indicator tag identifies the visual boundary.

4. The method of claim 1, further comprising selecting, by the server, the media element based on a unique identifier associated with the electronic device.

5. The method of claim 4, wherein the unique identifier is an IP address of the electronic device.

6. The method of claim 5, wherein the IP address of the electronic device is associated with location data of the electronic device.

7. The method of claim 1, wherein the visual indicator tag is a machine-readable code.

8. The method of claim 1, wherein the set of user attributes comprises at least one of an age, a sex category, an income level, an education level, or demographic data associated with the user.

9. The method of claim 1, further comprising selecting, by the server, the media element based on a request by the user.

10. The method of claim 1, wherein the electronic file is an augmented reality video displayed on the electronic device.

11. A system comprising a server comprising a processing unit and a nom transitory storage medium, storing processor executable instructions that when executed by the processing unit cause the server to:
retrieve an electronic file comprising a set images, the electronic file configured to be displayed on an electronic device operated by a user; identify within the set of images, an object image comprising a first object having a visual indicator tag; identify the visual indicator tag; retrieve information about the first object based on the visual indicator tag, the information comprising a category of the first object; retrieve another electronic file storing user profile data from a user profile having a set of attributes; select a media element based on the category of the first object and the user profile data; and while displaying, on the electronic device, the set of images of the electronic file, overlay the media element on the object image.

12. The system of claim 11, wherein when executed by the processing unit, the processor executable instructions cause the server to identify a visual boundary of the first object, wherein the server overlays, while displaying the set of images within the electronic file, the media element within the visual boundary.

13. The system of claim 12, wherein the visual indicator tag identifies the visual boundary.

14. The system of claim 11, wherein when executed by the processing unit, the processor executable instructions cause the server to select the media element based on a unique identifier associated with the electronic device.

15. The system of claim 14, wherein the unique identifier is an IP address of the electronic device.

16. The system of claim 15, wherein the IP address of the electronic device is associated with location data of the electronic device.

17. The system of claim 11, wherein the visual indicator tag is a machine-readable code.

18. The system of claim 11, the set of user attributes comprises at least one of an age, a sex category, an income level, an education level, or demographic data associated with the user.

19. The system of claim 11, wherein when executed by the processing unit, the processor executable instructions cause the server to select the media element based on a request by the user.

20. The system of claim 11, wherein the electronic file is an augmented reality video displayed on the electronic device.

* * * * *